UNITED STATES PATENT OFFICE.

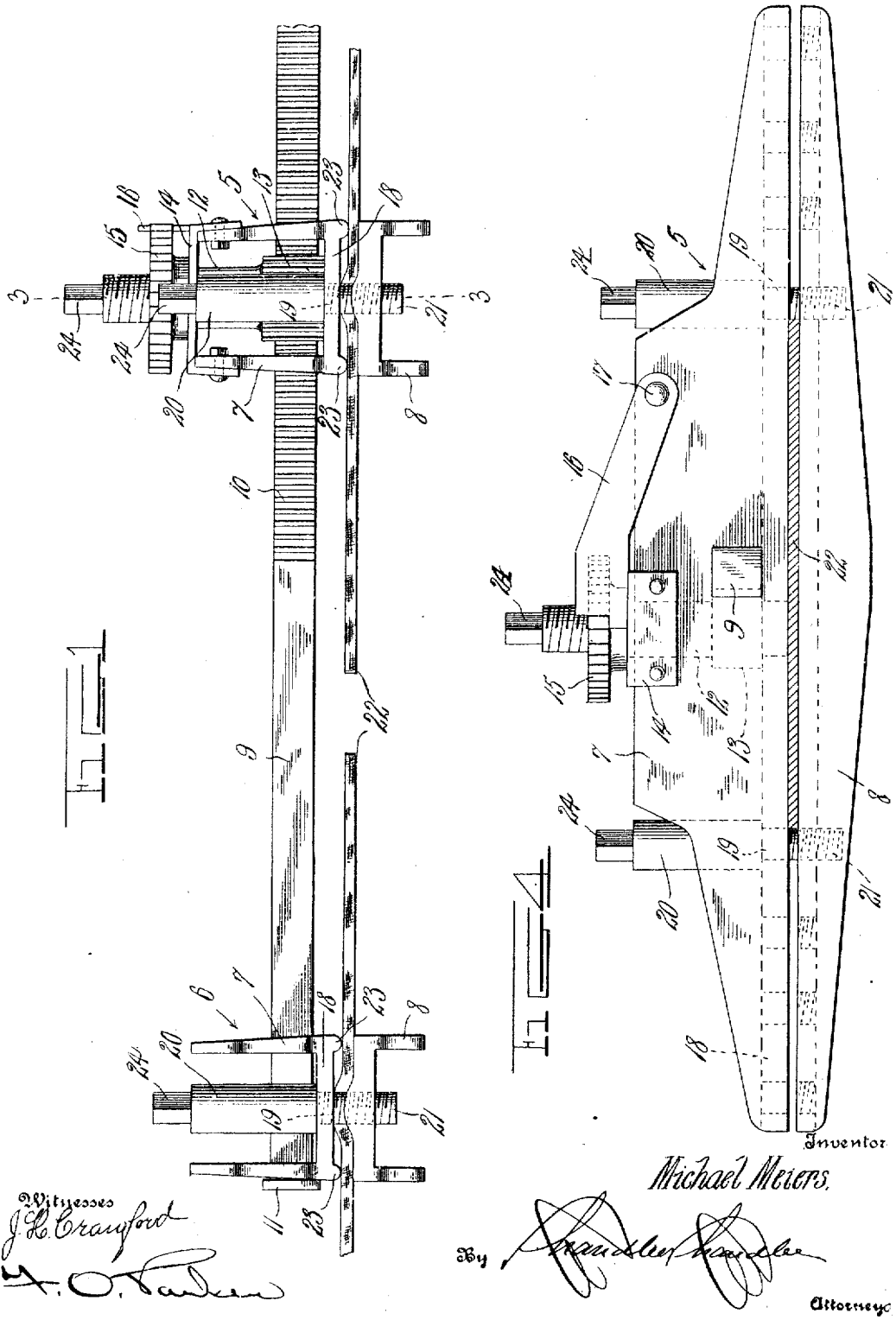

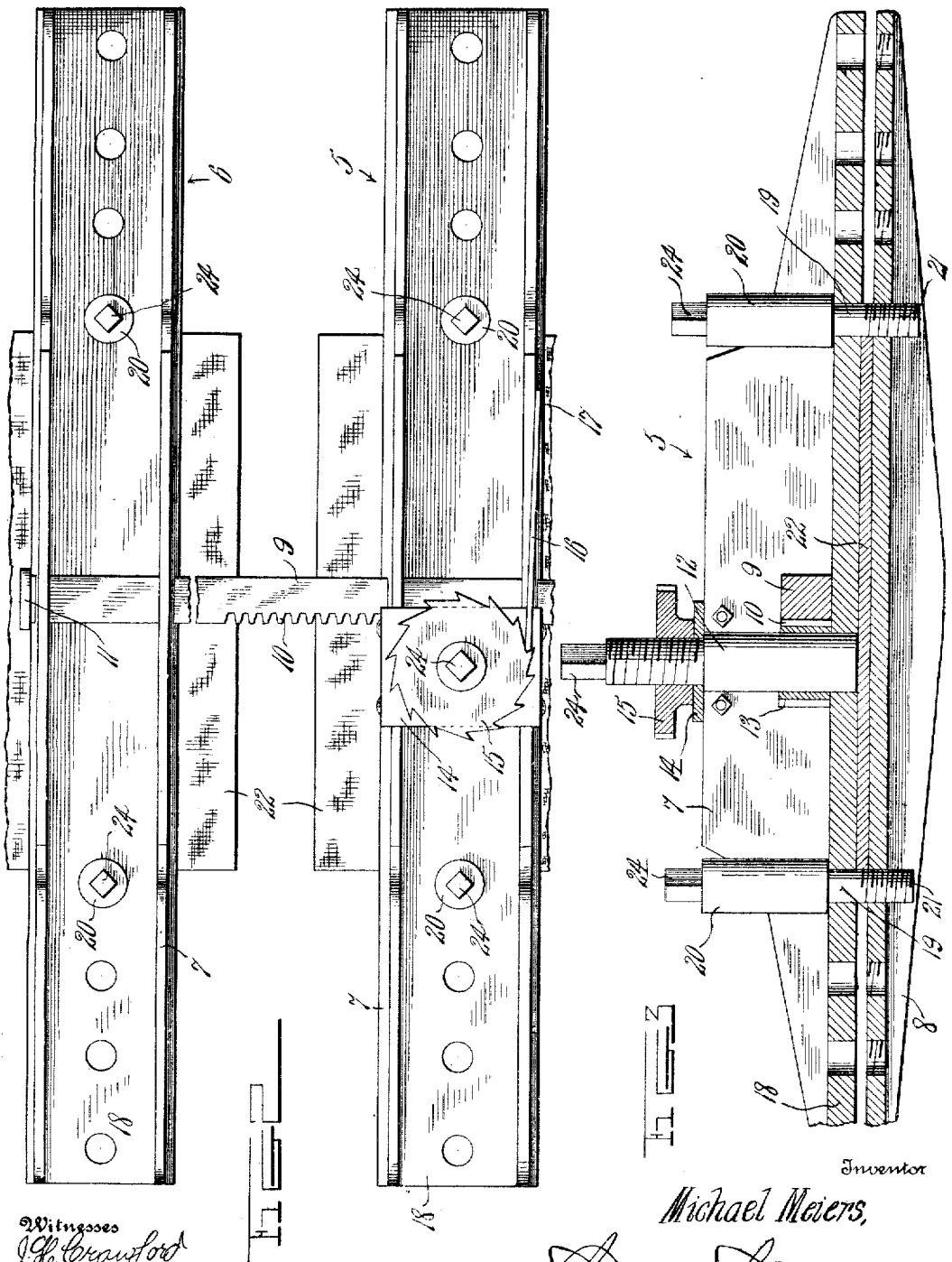

MICHAEL MEIERS, OF SHEFFIELD, ALABAMA.

BELT-TIGHTENER.

954,001.

Specification of Letters Patent. Patented Apr. 5, 1910.

Application filed December 14, 1908. Serial No. 467,467.

*To all whom it may concern:*

Be it known that I, MICHAEL MEIERS, a citizen of the United States, residing at Sheffield, in the county of Colbert, State of Alabama, have invented certain new and useful Improvements in Belt-Tighteners; and I do hereby declare the following to be a full, clear, and exact description of the invention, such as will enable others skilled in the art to which it appertains to make and use the same.

The invention relates to a belt tightener and more particularly to the class of belt tighteners for drawing together the belt ends to permit lacing thereof.

The primary object of the invention is the provision of a belt tightener in which the belt ends can be readily and easily drawn toward each other or together to permit the same to be joined by a lacing or other fastener without the necessity of removing the belt from the pulleys.

A further object of the invention is the provision of a belt tightener which is adapted to clamp the ends of a belt to permit the same to be drawn together, the clamping means being adapted to receive any width or thickness of belt and will enable the ends of the latter to be joined or laced together without the removal of the belt from the pulleys over which the same is trained.

With these and other objects in view the invention consists in the construction, combination and arrangement of parts as will be more fully hereinafter described and as illustrated in the accompanying drawings which disclose the preferred form of embodiment of the invention and as brought out in the appended claim.

It is to be understood that changes, variations and modifications may be made such as come properly within the scope of the claim hereunto appended without departing from the spirit of the invention.

In the drawings: Figure 1 is a side elevation of the invention and as applied to a belt. Fig. 2 is a top plan view thereof. Fig. 3 is a sectional view on the line 3—3 of Fig. 1. Fig. 4 is a sectional view showing the rack and pinion.

Similar reference characters indicate corresponding parts throughout the several views in the drawings.

In the drawings, there is shown a pair of clamping heads designated generally by the numerals 5 and 6 each of which comprises upper and lower members 7 and 8 which are substantially U-shape in cross section and are of equal length with respect to each other. Centrally within the spaced vertical parallel walls or flanges of the upper members 7 are suitable openings receiving a bar 9 which latter is formed in one side edge with a series of rack teeth 10 which extend throughout a considerable portion of the length of the bar. One end of the bar is formed with a head 11 which engages or has its bearing against the outer face of one of the flanges of one upper member to prevent the bar from being pulled or disengaged from the same.

Mounted vertically within the other upper member of the clamping head 5 is a stud shaft 12 the latter having formed thereon a pinion 13 which is in mesh with the rack teeth 10 of the bar 9. Secured to the upper member 7 of the head 5 is a bridge plate 14 forming a bearing for the stud shaft 12 to hold the same rotary mounted within the said upper member.

In threaded engagement with the stud shaft 12 above the bridge plate 14 is a ratchet wheel 15 which latter is engaged by a pawl 16 connected to the upper member 7 by a pivot 17 and which pawl is adapted to lock the ratchet wheel against rotation in one direction.

Formed centrally in the base portions 18 of the upper member 7 are a series of spaced openings freely receiving the reduced ends 19 of turning pins 20 and which reduced ends 19 are threaded as at 21 to engage threaded openings contained in the lower members 8 and in register with the openings in the upper members of the clamping heads. It is obvious that upon turning the turning pins 20 in one direction the same will draw together the upper and lower members of the clamping heads so as to secure therebetween the belt ends 22 of a belt so that the said belt ends can be laced or otherwise secured together. On the adjacent faces of the members 7 and 8 are formed longitudinal gripping ribs 23 which engage in the belt ends 22 when the clamping heads are connected thereto so as to prevent the accidental slipping of the belt ends from the clamping heads. To enable the turning pins to be actuated and also the stud shaft 12 the same are provided with squared extremities 24 to permit the application of a turning crank, wrench or the like to the said shaft and pins to enable the same to be manipulated for carrying out the operation of the tightener.

What is claimed is—

A belt tightener of the class described comprising clamping heads, each including upper and lower channel bars having adjacent clamping surfaces to engage the meeting ends of the belt, said bars having openings arranged at intervals longitudinally thereof, the openings in the upper and lower bars being in register with each other, threaded adjustable pins loosely passed through a pair of openings in the upper bars and in threaded engagement with a pair of registering openings in the lower bars, a rack bar passed loosely through one upper bar and slidably engaging the other upper bar, and having a headed terminal to form an abutment for one of the bars, a stud shaft mounted vertically in the last named upper bar, a pinion fixedly mounted on said shaft and engaging said rack bar, a ratchet wheel above said pinion and in threaded engagement with said shaft, a spring pawl with one end connected at one side of said last named upper bar, and the other end engaging said ratchet wheel, one end of each pin and shaft being formed with a squared terminal, the said terminals being of corresponding size with respect to each other, and a bridge piece fixed transversely of the last named upper bar and vertically supporting the shaft.

In testimony whereof, I affix my signature, in presence of two witnesses.

MICHAEL MEIERS.

Witnesses:
A. W. DUDLEY,
H. A. PORTERFIELD.